3,065,219
PROCESS FOR POLYMERIZING BUTADIENE
Albert Verheyden, St Denis-Westrem, Belgium, and Paul Ochsner, Geneva, Switzerland, assignors to UCB (Union Chimique-Chemische Bedrijven), S.A., a corporation of Belgium
No Drawing. Filed May 26, 1958, Ser. No. 737,512
Claims priority, application Belgium June 6, 1957
8 Claims. (Cl. 260—94.3)

The structure of the polymers obtained by polymerizing diolefines varies with the catalysts used.

According to the Belgian Patent 549,554, filed on July 14, 1956, by Montecatini, it is known to polymerize butadiene using specific catalysts and to obtain a polymer with a high ratio of 1–2 addition units. These catalysts are prepared by reacting an organometallic compound of a metal of the groups I, II or III of the periodic system with an oxycompound of a transition metal of the groups IV, V or VI.

The present invention relates to a process for polymerizing 1,3-butadiene using new catalysts. The polymers obtained are non-sticky solids with a high ratio of 1–2 addition units. The catalysts used are prepared by reacting an organo sodium compound with a halogenated derivative of a transition metal of group IV of the periodic system, in the presence of an organometallic compound of a metal selected from the group consisting of zinc and cadmium.

Amylsodium is generally used as the organosodium compound. The organosodium compounds are prepared by known methods, for example, by reacting finely divided sodium with an alkyl chloride.

The organozinc or organocadmium compounds are also prepared by known methods. Generally diethylcadmium and diethylzinc are employed.

As halogenated derivatives of the transition metals of group IV, one uses for example titanium tetrachloride or zirconium tetrachloride.

The proportions of the compounds used in the preparation of the catalysts vary within the following limits: for 1 mole of a halogenated derivative of a transition metal, one uses from 1 to 3 moles, preferably 2.5 moles of an organosodium compound and from 0.05 to 0.6 mole, preferably from 0.1 to 0.4 mole of an organocadmium or organozinc compound.

The nature of these new catalysts used is unknown. When the reaction product of amylsodium and titanium tetrachloride is used as catalyst, a butadiene polymer is obtained with a ratio of 1–2 addition units which is lower than 60%. However, if the reaction between amylsodium and titanium tetrachloride is carried out in the presence of small amounts of diethylcadmium or diethylzinc, a catalyst is prepared with which butadiene polymerizes in the form of a solid with more than 70% of 1–2 addition units. The polymer obtained using this last catalyst is practically insoluble in boiling ether.

Generally the polymerization is carried out in the presence of a solvent. One uses preferably an aliphatic hydrocarbon such as pentane. When liquid butadiene polymerizes, it is possible to use only the quantity of solvent necessary to the handling of the catalyst.

The polymerization temperature ranges between −40 and +40° C. and is preferably of about 20° C. The butadiene pressure is lower than 5 atmospheres during the reaction and generally of 1.5 atmospheres. When the polymerization is carried out at atmospheric pressure, the temperature must be maintained under the boiling point of the butadiene. The duration of the reaction is comprised between 4 and 24 hours and is preferably of about 20 hours.

The catalyst is introduced in the reaction medium before or during the polymerization. When a solvent is used, the addition of the catalyst is carried out before the introduction of the butadiene in the solvent.

After the polymerization, the catalyst is destroyed by means of an aliphatic alcohol and the polymer is succussively washed with ethanol acidified by hydrochloric acid, with water and finally with ethanol. In order to avoid the degradation of the polymer during the drying, it is advantageous to add an anti-oxidant such as beta-phenylnaphtylamine to the ethanol.

The infra-red spectra of the obtained polymers show that they contain at least 70% of 1–2 addition units, the remainder being formed of 1–4 addition units. Said polymers are in the form of solid crystals and are insoluble in boiling ether, whereas amorphous polybutadienes, i.e. non-crystalline, are soluble for the greater part in ether.

As the polymers obtained in accord with the instant invention are formed principally of crystalline polymers having 1–2 addition units, they are not rubbery and can therefore be molded and extruded. This is not true of rubber-like butadiene polymers, i.e. elastomers.

The polymers prepared according to the present invention can be employed in the manufacture of articles using compression or injection moulding, extrusion in sheets, tubes or threads, wire-drawing by melting or starting from solutions, etc.

The examples describe the preparation of such polymers, but it is obvious that the invention is not limited by the examples given.

*Example 1*

A catalyst is prepared by adding 10 millimoles titanium tetrachloride to a mixture of 25 millimoles of amylsodium and one millimole of diethylcadmium in 150 ml. of pentane. The catalyst is transferred into an iron pressure resisting tube fitted with a manometer and having a capacity of 280 ml. A cover provided with a pressure reducing valve is fitted on to this. The tube is then placed in a vertical position and connected at the base to a cylinder of butadiene.

A flow of pure 1,3-butadiene is then passed through in order to remove the air remaining inside the tube, the pressure reducing valve is then closed and gaseous butadiene is admitted until the pentane is saturated under a pressure of 1.5 kg./cm.$^2$. This pressure is maintained for 20 hours at 20° C. The excess gas is then removed through the upper part of the tube and the content of this latter is treated with ethanol to destroy the catalyst. The polymer is filtered, washed with ethanol acidified with hydrochloric acid and thereafter several times with water to dissolve the salts which are formed. A further washing with ethanol containing beta-phenylnaphtylamine is carried out and the polymer is thereafter dried at room temperature.

There is obtained 24 g. of a white solid polymer with 71% of 1–2 addition units. The fraction of this polymer which is insoluble in boiling water represents 60% of the total weight.

*Example 2*

The catalyst is prepared by adding 10 millimoles of titanium tetrachloride to a mixture of 25 millimoles amylsodium and 2 moles of diethylcadmium in 150 ml. of pentane. Under the conditions described in Example 1, there is obtained 18.5 g. of a solid polymer with 76% of 1-2 addition units. The fraction of this polymer which is insoluble in boiling ether represents 69% of the total weight.

*Example 3*

A catalyst is prepared according to Example 2, but using 4 millimoles of diamylcadmium in place of 2 millimoles of diethylcadmium. With this catalyst and under the conditions described in Example 1, there is obtained 25 g. of a polymer with 78% of 1-2 addition units whose fraction insoluble in boiling ether represents 69% of the total weight.

*Example 4*

The catalyst is prepared by adding 10 millimoles of zirconium tetrachloride to a mixture of 25 millimoles of amylsodium and 2.3 millimoles of diethylcadmium in 150 ml. of pentane. Under the conditions described in Example 1, there is obtained 26 g. of a solid polymer with 77% of 1-2 addition units and whose fraction insoluble in boiling ether represents 52% of the total weight.

*Example 5*

The catalyst is prepared by adding 10 millimoles of titanium tetrachloride to a mixture of 25 millimoles amylsodium and diethylzinc in 150 ml. of pentane. According to the amounts of diethylzinc used and under the experimental conditions described in Example 1, polymers are obtained whose weight and characteristics are given in the following table:

| Diethylzinc | Yield, g. | Ratio of 1-2 addition units, percent | Fraction insoluble in boiling ether, percent |
|---|---|---|---|
| 1 millimole | 21 | 65 | 50 |
| 2.4 millimoles | 16.5 | 69 | 57 |
| 4 millimoles | 12 | 74 | 87 |

*Example 6*

100 g. of butadiene are condensed at −40° C. in a flask. Under stirring there is thereto added the catalyst prepared by reacting 10 millimoles of titanium tetrachloride with 25 millimoles of amylsodium and 1.5 millimole of diethylcadmium in suspension in 60 ml. of pentane. Stirring is maintained during one hour at −40° C. The temperature is thereafter allowed to rise in order to evaporate the excess of monomer. After 24 hours the product is treated as described in Example 1. There is obtained 31 g. of a solid polymer with 72% of 1-2 addition units whose fraction insoluble in boiling ether represents 51% of the total weight.

We claim:

1. The catalytic polymerization of butadiene comprising: (1) contacting butadiene with a catalyst in the presence of an aliphatic hydrocarbon as solvent at a temperature between −40° and +40° C. and under a pressure below 5 atmospheres, said catalyst consisting essentially of the reaction product of 1 mole of a metal halide selected from the group consisting of titanium and zirconium tetrachlorides with from 1 to 3 moles of amyl sodium in the presence of from 0.05 to 0.6 mole of an organometallic compound selected from the group consisting of diethylcadmium, diamylcadmium and diethylzinc; (2) treating the polymerization mass with an aliphatic alcohol; and (3) washing the resulting polymer successively (a) with ethanol acidified with hydrochloric acid, (b) with water and (c) with ethanol containing an antioxidant; whereby solid non-sticky polymer of butadiene having a high ratio of 1-2 addition units is obtained.

2. The catalytic polymerization of butadiene comprising: (1) contacting butadiene with a catalyst in the presence of an aliphatic hydrocarbon as solvent at a temperature between −40° and +40° C. and under a pressure below 5 atmospheres, said catalyst consisting essentially of the reaction product of 1 mole of a metal halide selected from the group consisting of titanium and zirconium tetrachlorides with about 2.5 moles of amyl sodium in the presence of from 0.1 to 0.4 mole of an organometallic compound selected from the group consisting of diethylcadmium, diamylcadmium and diethylzinc; (2) treating the polymerization mass with an aliphatic alcohol; and (3) washing the resulting polymer successively (a) with ethanol acidified with hydrochloric acid) (b) with water and (c) wtih ethanol containing an antioxidane; whereby solid non-sticky polymer of butadiene having a high ratio of 1-2 addition units is obtained.

3. In the catalytic polymerization of butadiene and the isolation of resulting polymer, the improvement wherein 1,3-butadiene is brought into contact with a catalyst in the presence of an aliphatic hydrocarbon as solvent at a temperature between −40° and +40° C. and under a pressure below 5 atmospheres, said catalyst consisting essentially of the reaction product of 1 mole of a metal halide selected from the group consisting of titanium and zirconium tetrahalides with from 1 to 3 moles of amylsodium in the presence of from 0.05 to 0.6 mole of diethylcadmium, whereby solid-non-sticky polymer of butadiene having a high ratio of 1-2 addition units is obtained.

4. In the catalytic polymerization of butadiene and the isolation of resulting polymer, the improvement wherein 1,3-butadiene is brought into contact with a catalyst in the presence of an aliphatic hydrocarbon as solvent at a temperature between −40° and +40° C. and under a pressure below 5 atmospheres, said catalyst consisting essentially of the reaction product of 1 mole of a metal halide selected from the group consisting of titanium and zirconium tetrahalide with from 1 to 3 moles of amylsodium in the presence of from 0.05 to 0.6 mole of diamylcadmium, whereby solid non-sticky polymer of butadiene having a high ratio of 1-2 addition units is obtained.

5. In the catalytic polymerization of butadiene and the isolation of resulting polymer, the improvement wherein 1,3-butadiene is brought into contact with a catalyst in the presence of an aliphatic hydrocarbon as solvent at a temperature between −40° and +40° C. and under a pressure below 5 atmospheres, said catalyst consisting essentially of the reaction product of 1 mole of a metal halide selected from the group consisting of titanium and zirconium tetrahalides with from 1 to 3 moles of amylsodium in the presence of from 0.05 to 0.6 mole of diethylzinc, whereby solid non-sticky polymer of butadiene having a high ratio of 1-2 addition units is obtained.

6. A method of polymerizing butadiene which comprises contacting 1,3-butadiene with a catalyst consisting essentially of the reaction product of 1 mole of a metal halide selected from the group consisting of titanium and zirconium tetrahalides with from 1 to 3 moles of amyl sodium in the presence of from 0.05 to 0.6 mole of an organometallic compound selected from the group consisting of diethylcadmium, diamylcadmium and diethylzinc, the polymerization being carried out in the presence of an aliphatic hydrocarbon as solvent, at a temperature between −40° and +40° C. and under a pressure below 5 atmospheres.

7. A catalyst which consists essentially of the reaction product of 1 mole of zirconium tetrachloride with from 1 to 3 moles of amyl sodium in the presence, in the reaction mixture, of from 0.05 to 0.6 mole of diethyl cadmium.

8. A catalyst which consists essentially of the reaction product of 1 mole of zirconium tetrachloride with from 1 to 3 moles of amyl sodium in the presence, in the reaction mixture, of from 0.05 to 0.6 mole of diamyl cadmium.

References Cited in the file of this patent

UNITED STATES PATENTS

| | | |
|---|---|---|
| 2,832,759 | Nowlin et al. | Apr. 29, 1958 |
| 2,868,772 | Ray | Jan. 13, 1959 |
| 2,881,156 | Pilar | Apr. 7, 1959 |
| 2,886,561 | Reynolds | May 12, 1959 |
| 2,905,659 | Miller | Sept. 22, 1959 |
| 2,920,062 | McFarland | Jan. 5, 1960 |

FOREIGN PATENTS

| | | |
|---|---|---|
| 538,453 | Italy | Jan. 25, 1956 |
| 215,043 | Australia | Nov. 1, 1956 |
| 545,952 | Belgium | Sept. 10, 1956 |
| 554,685 | Belgium | Aug. 2, 1957 |
| 1,155,190 | France | Apr. 23, 1958 |